United States Patent
Zhang et al.

(10) Patent No.: US 9,689,291 B2
(45) Date of Patent: Jun. 27, 2017

(54) PUMP PURGE FOR UREA DOSING SYSTEM

(71) Applicant: Cummins IP, Inc., Columbus, IN (US)

(72) Inventors: Shu Zhang, Columbus, IN (US); Srivardhan Chandrapati, Columbus, IN (US); Mugdha Naik, Columbus, IN (US); Srinivasa V. Rajagopalan, Ann Arbor, MI (US); Wei Huang, Columbus, IN (US); George Muntean, Columbus, IN (US); Andrew Myer, Greenwood, IN (US)

(73) Assignee: Cummins IP, Inc., Columbus, IN (US)

( * ) Notice: Subject to any disclaimer, the term of this patent is extended or adjusted under 35 U.S.C. 154(b) by 0 days.

(21) Appl. No.: 14/775,126

(22) PCT Filed: Mar. 14, 2014

(86) PCT No.: PCT/US2014/028001
§ 371 (c)(1),
(2) Date: Sep. 11, 2015

(87) PCT Pub. No.: WO2014/143851
PCT Pub. Date: Sep. 18, 2014

(65) Prior Publication Data
US 2016/0040575 A1    Feb. 11, 2016

Related U.S. Application Data

(60) Provisional application No. 61/788,435, filed on Mar. 15, 2013.

(51) Int. Cl.
*F01N 3/30* (2006.01)
*F01N 3/08* (2006.01)
*F01N 3/20* (2006.01)

(52) U.S. Cl.
CPC ........... *F01N 3/0871* (2013.01); *F01N 3/208* (2013.01); *F01N 3/30* (2013.01); *F01N 2610/02* (2013.01);
(Continued)

(58) Field of Classification Search
CPC .. F01N 3/208; F01N 2610/02; F01N 2610/08; F01N 2610/1406;
(Continued)

(56) References Cited

U.S. PATENT DOCUMENTS 6,912,846 B2   7/2005  Huber et al.
2005/0252201 A1  11/2005  Lecea et al.
(Continued)

FOREIGN PATENT DOCUMENTS

WO   WO-2013/028741      2/2013
WO   WO 2013028714 A1 *  2/2013  ........... F01N 3/2066

OTHER PUBLICATIONS

The International Search Report and the Written Opinion of the International Searching Authority issued in PCT/US2014/028001, dated Jul. 25, 2014.

*Primary Examiner* — Jorge Leon, Jr.
(74) *Attorney, Agent, or Firm* — Foley & Lardner LLP

(57) ABSTRACT

According to one embodiment, a diesel exhaust fluid purging system includes a metering valve with a supply port and a delivery port. The purging system also includes a pump assembly that is fluidly connected to the supply port of the metering valve. The pump assembly includes a pump and a single supply line that is fluidly connectable with a diesel exhaust fluid source. The purging system further includes an injection assembly that is fluidly connected to the delivery port of the metering valve. The injection assembly includes an air supply line that is fluidly connectable with an air supply source. Additionally, the purging system includes a
(Continued)

controller in electrical communication with the metering valve, the pump assembly, and the injection assembly. The controller is configured to purge the pump assembly of residual diesel exhaust fluid using air from the air supply line.

20 Claims, 4 Drawing Sheets

(52) U.S. Cl.
CPC .... *F01N 2610/08* (2013.01); *F01N 2610/144* (2013.01); *F01N 2610/1406* (2013.01); *F01N 2610/1466* (2013.01); *F01N 2610/1473* (2013.01); *F01N 2610/1493* (2013.01); *Y02T 10/24* (2013.01)

(58) Field of Classification Search
CPC ....... F01N 2610/144; F01N 2610/1466; F01N 2610/1473; F01N 2610/1493
USPC .................. 60/274, 277, 286, 295, 296, 301
See application file for complete search history.

(56) References Cited

U.S. PATENT DOCUMENTS

| | | |
|---|---|---|
| 2009/0205316 A1 | 8/2009 | Dougnier et al. |
| 2010/0122521 A1 | 5/2010 | Sun et al. |
| 2013/0055701 A1* | 3/2013 | Yan .................. F01N 3/208 60/287 |

* cited by examiner

PUMP PURGE FOR UREA DOSING SYSTEM

CROSS-REFERENCE TO RELATED APPLICATION

This application is a U.S. National Stage Application of PCT Application No. PCT/US2014/028001, which claims the benefit of U.S. Provisional Patent Application No. 61/788,435, filed Mar. 15, 2013, the contents of which are incorporated herein by reference in their entirety.

FIELD

The present disclosure relates to diesel exhaust fluid injection systems and more particularly relates to an apparatus, system, and method for priming a diesel exhaust fluid injection pump.

BACKGROUND

Exhaust emissions regulations for internal combustion engines have become more stringent over recent years. Therefore, the use of exhaust after-treatment systems on engines to reduce harmful exhaust emissions is increasing. Typical exhaust after-treatment systems include any of various components configured to reduce the level of harmful exhaust emissions present in the exhaust gas. Emission requirements vary according to engine type. For example, emissions tests for compression-ignited engines (e.g., diesel-powered engines) typically monitor the concentration of carbon monoxide, nitrogen oxides (NOx), and unburned hydrocarbons (UHC) that are released from the tail-pipe to make sure that the concentrations of such compounds leaving the tail-pipe are within certain emissions standards. With regard to reducing NOx emissions, NOx reduction catalysts, including selective catalytic reduction (SCR) components, have been used to convert NOx (NO and $NO_2$, in some fraction) to $N_2$ and other compounds.

Conventional SCR components utilize a diesel exhaust fluid (DEF) (e.g., aqueous urea, ammonia, etc.) as a reagent to reduce the NOx. When the proper amount of ammonia is present in the exhaust gas stream at the SCR catalyst, the ammonia is consumed (oxidized) in the reaction and the NOx is reduced. However, accurately controlling the amount and dispersion of ammonia in the exhaust gas stream can be difficult. While anhydrous ammonia can be used, it is toxic and difficult to safely store. Aqueous ammonia or urea is often used as the reductant because such compounds are safer to store than anhydrous ammonia. Urea, which consists of two primary amine groups joined by a carbonyl, is the safest to store; however, the urea must be thermally decomposed into ammonia and vaporized before being oxidized as a reagent in the SCR catalyst.

Also, since the selectivity and overall reactivity of catalytic reactions (e.g., SCR) is largely dependent on the extent of dispersion of the reactants and reagents across the surface of the catalyst (e.g. stoichiometric ratio), sufficiently mixing and diffusing the DEF into the exhaust gas stream is critical to the success of SCR. Thus, aftertreatment systems that use ammonia-facilitated SCR components often include a DEF pumping system that injects the DEF into the exhaust gas stream. Such pumping systems, however, often suffer from poor start-up performance. For example, if the engine (and therefore the aftertreatment system) has not been operating for a period of time, segmented columns of air form throughout the DEF lines of the pumping system, potentially causing the pump to dead-head (i.e. produce no net flow) upon actuation (e.g., upon engine ignition and pump initialization). Various conventional systems have been implemented that attempt to counteract this problem by priming the pumping system. However, these priming systems often include multiple lines extending to and from the DEF source, which adds cost and complexity to the aftertreatment system.

SUMMARY

The subject matter of the present application has been developed in response to the present state of the art, and in particular, in response to the problems and needs in DEF pumping systems that have not yet been fully solved by currently available purging systems. Accordingly, the subject matter of the present application has been developed to provide an apparatus, system, and method for controlling a purging and priming process that overcomes at least some shortcomings of the prior art approaches.

According to one embodiment, a diesel exhaust fluid purging system includes a metering valve with a supply port and a delivery port. The purging system also includes a pump assembly that is fluidly connected to the supply port of the metering valve. The pump assembly includes a pump and a single supply line that is fluidly connectable with a diesel exhaust fluid source. The purging system further includes an injection assembly that is fluidly connected to the delivery port of the metering valve. The injection assembly includes an air supply line that is fluidly connectable with an air supply source. Additionally, the purging system includes a controller in electrical communication with the metering valve, the pump assembly, and the injection assembly. The controller is configured to purge the pump assembly of residual diesel exhaust fluid using air from the air supply line.

In some implementations of the purging system, the pump includes an inlet and an outlet, where the single supply line is fluidly connected to the pump inlet. The purging system may further include an accumulation line that fluidly connects the pump outlet to the supply port of the metering valve, and a bypass line that fluidly connects the accumulation line to the supply line. The bypass line may include a bypass valve. According to certain implementations, the injection assembly includes a delivery line that is fluidly connected to the delivery port of the metering valve and fluidly connectable with an exhaust aftertreatment system. The injection assembly may also include an air supply valve in the air supply line, where the air supply line is fluidly connected to the delivery line. The accumulation line can include a vessel for containing pressurized fluid.

According to certain implementations of the purging system, the controller closes the bypass line, and while the bypass line is closed, opens the metering valve to allow air from the air supply source to enter the accumulation line via the air supply line. The controller opens the bypass line to lower the pressure in the accumulation line before closing the bypass line and opening the metering valve. In some implementations, the DEF source contains urea and water.

According to yet another embodiment, a method is disclosed for purging a diesel exhaust fluid system that has a diesel exhaust fluid source, a pump downstream of the source, a metering valve downstream of the pump, a bypass valve downstream of the pump and upstream of the metering valve, and an air supply valve downstream of the metering valve. The method includes opening the bypass valve and the air supply valve. Additionally, the method includes, after opening the bypass valve and the air supply valve, opening the metering valve. Also, the method includes, after opening the metering valve, closing the metering valve. Further, the method includes closing the bypass valve and the air supply valve after closing the metering valve; and actuating the pump after closing the bypass valve and the air supply valve.

In some implementations of the method, only a single fluid supply line receives diesel exhaust fluid from the diesel exhaust fluid source. Only a single fluid supply line to the diesel exhaust fluid source may exist between the pump and the metering valve in certain implementations. According to yet some implementations, only a single fluid supply line to the diesel exhaust fluid source exists between the pump and the air supply valve.

According to certain implementations, the method also includes predicting the presence of discrete columns of air in a fluid line between the diesel exhaust fluid source and the pump. Further, opening the bypass valve and the air supply valve occurs after predicting the presence of discrete columns of air in the fluid line.

In yet certain implementations, prior to opening the metering valve, the method includes pressurizing a fluid line between the metering valve and the air supply valve with pressurized air. Only a single fluid supply line can receive diesel exhaust fluid from the diesel exhaust fluid source in some implementations. The method may also include purging the single fluid supply line of discrete columns of air with the pressurized air can occur after opening the metering valve. A pressure of the pressurized air can be greater than a pressure of diesel exhaust fluid in the single supply line.

According to another embodiment, a controller apparatus for a diesel exhaust fluid system is disclosed. The system includes a pump assembly that is fluidly connected to an injection assembly via a metering valve. The controller apparatus includes an initialization module that is configured to receive system conditions. The apparatus also includes a purge module that is configured to receive operating requests from the initialization module and send operating commands to purge the system. The purge module includes an air supply module that is configured to control an air flow into the injection assembly, a metering valve module that is configured to control air flow into the pump assembly for purging the pump assembly, and a bypass valve module that is configured to control diesel exhaust fluid flow back into a diesel exhaust fluid source.

In some implementations, the controller apparatus also includes a prime module configured to receive operating requests from the initialization module or the purge module and send operating commands to prime the system.

According to certain implementations, the purge module further includes a diesel exhaust fluid source module configured to control a source of diesel exhaust fluid.

In yet some implementations of the apparatus, in response to operating commands to purge the system, the bypass module opens a bypass valve to allow diesel exhaust fluid to flow back into the diesel exhaust fluid source, the air supply module controls the air flow to build up air pressure downstream of the metering valve, and the metering valve module opens the metering valve to allow pressurized air downstream of the metering valve to flow into the injection assembly.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

As described briefly above in the Background section, internal combustion engines, such as compression ignited engines (e.g., diesel engines), emit exhaust gas as a product of the combustion reaction. The exhaust gas contains compounds that can be harmful to the environment. Accordingly, exhaust gas aftertreatment systems are often employed to convert pollutants into less harmful compounds, thereby reducing the overall negative environmental impact of the exhaust gas. While conventional exhaust gas aftertreatment systems may include various components, one specific emissions unit for reducing the NOx content in an exhaust gas stream is an SCR component.

SCR components utilize a diesel exhaust fluid (DEF) (e.g., ammonia) as a reagent to reduce the NOx in the exhaust gas stream. DEF may include a mixture of urea and deionized water. For example, the DEF source may comprise 32.5% urea and 67.5% deionized water. When the proper amount of ammonia is present in the exhaust gas stream at the SCR catalyst, the ammonia is consumed (oxidized) in the reaction and the NOx is reduced. In one embodiment, multiple SCR components may be used at different upstream/downstream positions in the aftertreatment system. In another embodiment, a single SCR component may include multiple catalyst beds. The SCR component may also include an SCR catalyst bed that, for example, may be a vanadium-based catalyst and, in other implementations, the SCR component may have a zeolite-based catalyst, such as a Cu-Zeolite or a Fe-Zeolite catalyst. SCR components also generally include a reductant delivery system upstream of the upstream SCR catalyst. The reductant delivery system is operable to inject or dose a reductant into the exhaust gas prior to the gas entering the SCR catalyst bed.

Throughout the present disclosure, the reductant is referred to as a diesel exhaust fluid (DEF) and, according to one embodiment, the DEF is a urea-water solution, which decomposes into ammonia. In the SCR process, the NOx compounds and ammonia are adsorbed onto the surface of the catalyst where they react to form $N_2$ (reduced NOx) and $H_2O$ (oxidized ammonia).

Figure 1:
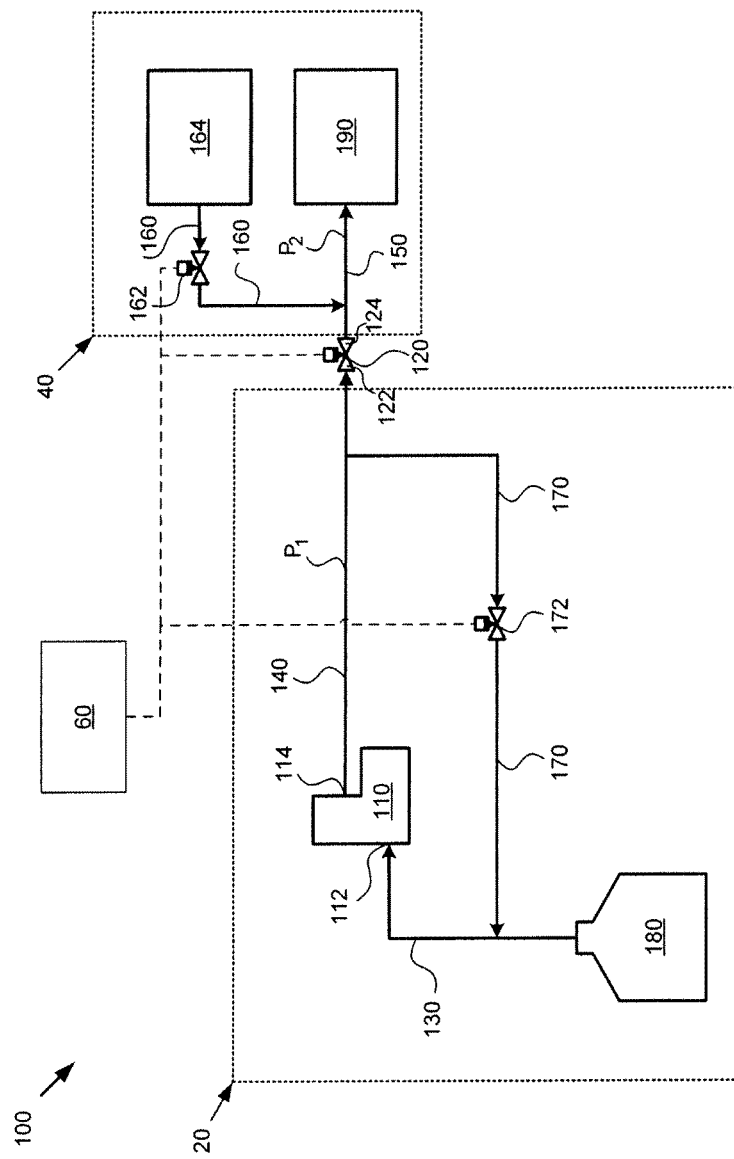
FIG. 1 is a schematic block diagram of a diesel exhaust fluid purging system having a single supply line from the diesel exhaust fluid source, according to one embodiment.

The present disclosure specifically relates to a DEF delivery system that utilizes a pumping device to generate DEF flow. FIG. 1 is a schematic block diagram of a diesel exhaust fluid purging system 100 having a single supply line 130 extending from a diesel exhaust fluid source 180, according to one embodiment. The diesel exhaust fluid purging system 100 includes a metering valve 120 that has a supply port 122 and a delivery port 124. The metering valve 120 couples a pump assembly 20 (at the supply port 122) of the purging system 100 to an injection assembly 40 (at the delivery port 124) of the purging system 100. Also depicted in FIG. 1 is a controller 60 for managing the operations of the system 100. The controller 60 will be described in greater detail below with reference to FIG. 4.

The pump assembly 20 of the purging system includes a pump 110 with an inlet 112 that is fluidly connected to a diesel exhaust fluid source 180 via a supply line 130. An outlet 114 of the pump 110 is fluidly connected to the supply port 122 of the metering valve 120 via an accumulation line 140. The pump assembly 20 of the system 100 also includes a bypass valve 172 and a bypass line 170 that fluidly connects the accumulation line 140 to the supply line 130. The injection assembly 40 of the system 100 includes a delivery line 150 that fluidly connects the delivery port 124 of the metering valve 120 to an exhaust aftertreatment system 190. The injection assembly 40 also includes an air supply valve 162 and an air supply line 160 that fluidly connects an air supply source 164 to the delivery line 150. Each of these various components is described in greater detail below.

As depicted and according to one embodiment, the purging system 100 generally operates to draw DEF liquid from a DEF source 180, move the DEF liquid through various lines, valves, and components of the purging system 100, and deliver the DEF liquid to the aftertreatment system 190. As briefly described above, the DEF liquid may be any reductant compound, such as a urea-water solution, that can be used to catalytically reduce NOx. The DEF source 180 may thus include a vessel or compartment that contains DEF. In one embodiment, the vessel 180 is configured to hold a large volume of DEF so that only periodic charges are needed to refill the vessel. For example, a ten gallon DEF tank 180 may be affixed to a truck and, depending on how many miles the truck drives, the DEF tank 180 may only need to be refilled every month or so. The consumption rate of DEF is directly proportional to the consumption rate of fuel. For example, compression ignited diesel engines generally consume DEF at a rate of about 2% of the fuel consumption rate, according to one embodiment.

The DEF is drawn out of the DEF vessel 180 via suction pressure created by the operation of the pump 110. The pump 110 may be one of various types of pumps, such as a centrifugal pump or a positive displacement pump. According to one embodiment, the pump 110 may be a piston-type pump that suctions DEF into the chamber while expanding the chamber volume and pushes DEF out of the chamber while compressing the chamber volume. The pump suctions DEF from the DEF vessel 180 through the supply line 130 and into the pump 110 through the pump inlet 112. The supply line 130 may be tubing or piping constructed of a material that is capable of withstanding the suction pressure generated by the pump 110 during operation. Such materials include, but are not limited to, plastic, polymer, rubber, metal, and glass. The length, cross-sectional shape and area, wall thickness, and other specifications of the supply line 130 may be selected according to the details of a particular embodiment. The other lines and components throughout the present disclosure, such as the accumulation line 140, the delivery line 150, the air supply line 160, and the bypass line 170, may also be constructed of such materials and may have size and orientation details according to the specifics of a particular embodiment.

According to one embodiment, the accumulation line 140 is a section of tubing or piping into which the pump 110 expels the pressurized fluid. In another embodiment, the accumulation line 140 may include a widened section of tubing or the accumulation line 140 may comprise a vessel for temporarily holding the pressurized DEF after exiting the pump 110. The accumulation line 140 may also include an accumulation manifold that includes several segments or multiple lines that contain the pressurized DEF. The accumulation line 140 may be reinforced so as to safely and securely contain the pressurized DEF.

The metering valve 120 controls the fluid flow between the pump assembly 20 and the injection assembly 40 of the purging system 100. The accumulation line 140 fluidly connects to the supply port 122 of the metering valve 120. When the metering valve 120 is closed and the pump 110 is operating, the DEF builds up in the accumulation line 140. Once the metering valve 120 is opened, the DEF may flow across the valve 120 and into the injection assembly 40 of the system 100 where it can be delivered to the exhaust aftertreatment system 190. According to one embodiment, the metering valve 120 may be an electrically actuated valve, such as a solenoid valve. In another embodiment, the metering valve 120 may be a pneumatic or hydraulic valve. The metering valve 120 may be manual or the metering valve 120 may be controlled by a controller or a module. Additionally, the metering valve 120 may be a flow rate valve, a pressure regulating valve, or an on-off type ball valve.

In the injection assembly 40 of the system 100, the delivery line 150 fluidly connects the delivery port 124 of the metering valve 120 to the exhaust aftertreatment system 190. Although throughout this disclosure the purging system 100 is referred to as a separate and stand-alone system from the aftertreatment system 190, it is contemplated that the purging system 100 of the present disclosure may be considered a component of an aftertreatment system 190 or as an extension of the piping manifold of an aftertreatment system 190. According to one embodiment, the delivery line 150 includes a length of tubing that extends from the metering valve 120 and further includes an injector or a dosing system for injecting DEF into the aftertreatment system 190 at a location at least upstream of a SCR component. For example, the delivery line 150 may include a spray nozzle or other fluid injector for introducing DEF uniformly into the exhaust aftertreatment system 190. In one embodiment, the delivery line 150 may also include mixing components, vaporizing components, heating components and other elements for promoting and facilitating the uniform dispersion of the DEF into the exhaust gas stream, thereby increasing the efficiency of the SCR reaction.

An air supply line 160 is also fluidly connected to the delivery line 150. The air supply line 160 includes an air supply valve 162 for controlling the flow of the air entering the delivery line 150. According to one embodiment, the air supply valve 162 may be an electrically actuated valve, such as a solenoid valve. In another embodiment, the air supply valve 162 may be a pneumatic or hydraulic valve. The air supply valve 162 may be manual or may be controlled by a controller or the engine's electronic controller module. Additionally, the air supply valve 162 may be a flow-rate valve or an on-off type ball valve. The flow of air into the delivery line 150 may facilitate the mixing and vaporization of the DEF. Additionally or alternatively, the air may act as a carrier medium to carry the DEF along the delivery line 150 and into the aftertreatment system 190. For example, the metering valve 120 may be merely a gate valve that, when opened, exposes the delivery port 124 to a venturi-type flow segment, thus when the high pressure air passes through the narrow venturi segment, the lower pressure draws the DEF into the delivery line 150. The air supply line 160 may be fluidly connected to or connectable to an air supply source 164. The air supply source 164 may include a pressurized air vessel, such as a compressed gas cylinder. In another embodiment, the air supply source 164 may comprise a compressor device that compresses ambient air, for example, a turbocharger on an automobile.

The bypass line 170 includes a bypass valve 172 and fluidly connects the accumulation line 140 to the supply line 130. According to one embodiment, the bypass valve 172 may be an electrically actuated valve, such as a solenoid valve. In another embodiment, the bypass valve 172 may be a pneumatic or hydraulic valve. The bypass vale 172 may also be manual or may be controlled by a controller or the engine's electronic controller module. Additionally, the bypass valve 172 may be a flow-rate valve or an on-off type ball valve. The bypass line 170, when the bypass valve 172 is opened, provides a route for the fluid to bypass the pump 110 and return from the accumulation line 140 back to the supply line 130. As described in greater detail below with reference to FIG. 2, the bypass line 170 facilitates priming the pump 110 and eliminates the need for a second line extending from the DEF source 180. Conventional DEF purging systems include a suction line and a return line both in fluid connection with the DEF source. However, the system 100 of the present disclosure utilizes a priming method that doesn't require a second line extending from the DEF source 180, thus decreasing the cost and complexity of running two independent lines to and from the DEF source and the other components of the purging system. P1 and P2, as depicted in FIG. 1, represent the pressure at certain points in the system and such pressures will be described in greater detail below with reference to FIG. 3.

Figure 2:
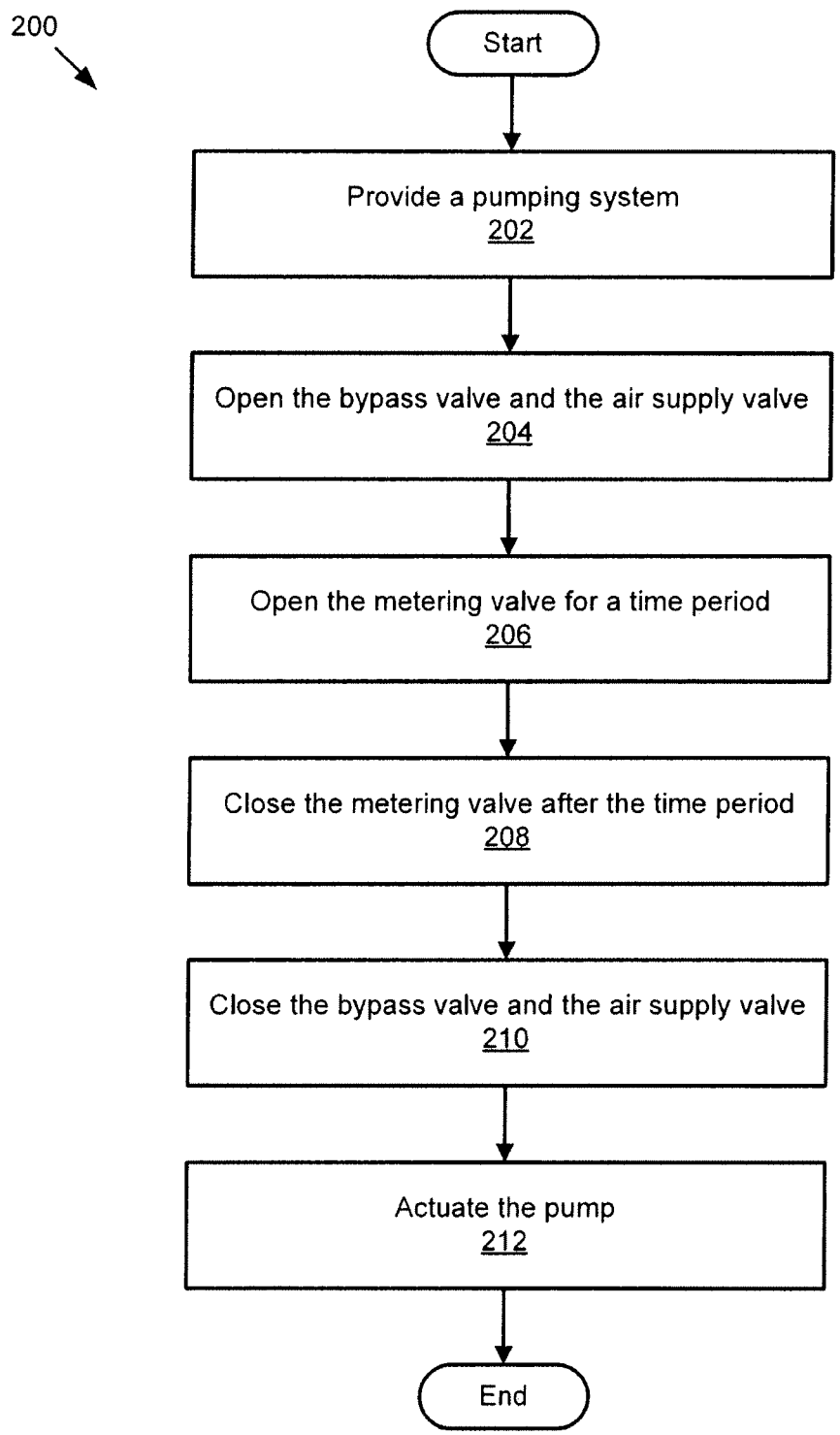
FIG. 2 is a schematic flow chart diagram of a method for priming a diesel exhaust fluid purging system, according to one embodiment.

FIG. 2 is a schematic flow chart diagram of a method 200 for priming a diesel exhaust fluid purging system 100, according to one embodiment. As mentioned previously, conventional systems often include two separate independent lines extending from the DEF source, one for drawing DEF into the pump and another for returning residual DEF to the DEF source during the priming process. Priming is a process of initializing the pump after a period of downtime. For example, when an internal combustion engine is not operating for a period of time, discrete columns of air form in the purging system lines. Without priming, the mixture of liquid and air in the system lines may prevent the pump, upon actuation/initialization, from engendering a net flow because the pressure downstream of the pump is higher than the pump is able to provide. This may cause system failure and may potentially damage the pumping chamber. Conventional priming systems, as mentioned above, solved this issue by using a second-independent line back to the DEF source to bleed residual DEF downstream of the pump (in the accumulation line) back to the DEF tank, thus maintaining a lower pressure downstream of the pump.

The present disclosure, however, relates to a system 100 and method 200 for priming a pump 110 that utilizes a single line 130 extending from the DEF source. The method 200 includes providing 202 a purging system 100 with the architecture and interconnectivity as described above with reference to FIG. 1. The method 200 further includes opening 204 the bypass valve 172 and the air supply valve 162. The method 200 next includes opening 206 the metering valve 120 for a period of time. The period of time may range from a few seconds to a few minutes or longer. After the period of time, the method 200 includes closing 208 the metering valve 120 and then closing 210 the bypass valve 172 and the air supply valve 162. The method 200 finally includes actuating 212 the pump 110. The method is described in greater detail below with reference to FIG. 3.

Figure 3:
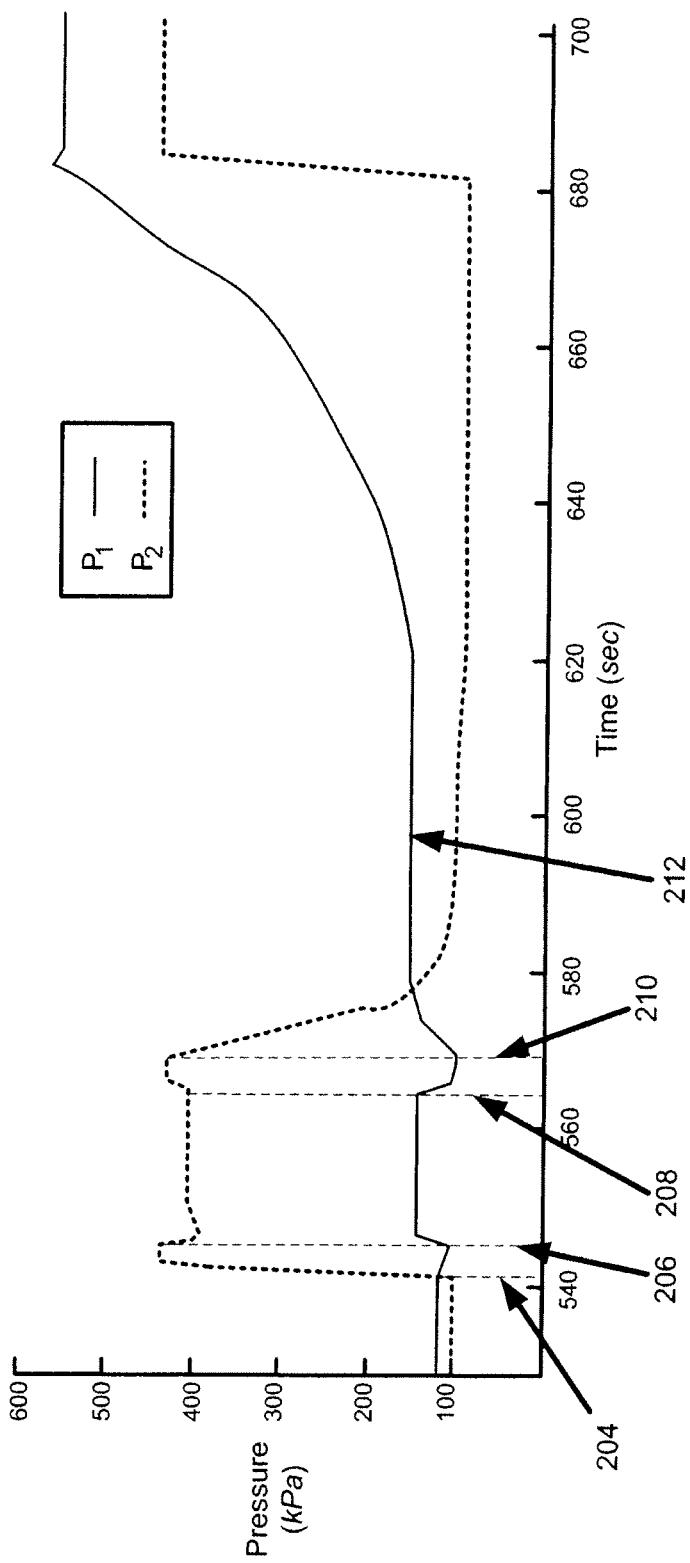
FIG. 3 is a graph showing the pressure in the accumulation line and the pressure in the delivery line as a function of time, according to one embodiment.

FIG. 3 is a graph showing the steps of the method 200 and the corresponding changes in pressure P1, P2 in the accumulation line 140 and in the delivery line 150 as a function of time, according to one embodiment. The graph has units of pressure, in kilopascals (kPA), along the y-axis and time, in seconds, along the x-axis. Before describing the steps of the method 200, it is useful to understand what would happen in a system 100 with the presently disclosed configuration and interconnectivity if the pump 110 was immediately initiated without going through the steps of the priming method 200. Without following the method 200, the pump 110 would fail to create a net fluid flow because the mixture of the segmented columns of compressible air with the residual DEF liquid in the system 100 lines would prevent the pump from generating an outlet pressure higher than the pressure in the accumulation line 140. In other words, as the mixture of air (compressible) and DEF liquid is pumped into the closed volume of the accumulation line 140, the volume in the accumulation line 140 would increase, thus increasing the pressure downstream of the pump 110. As the downstream pressure increases, the pump would be unable to generate high enough pressures to overcome the downstream pressure because of the compressible air mixed in with the DEF liquid.

Accordingly, the present disclosure provides a method 200 that enables the pump 110 to successfully prime. The method 200 includes opening 204 the bypass valve 172 and the air supply valve 162. According to the example depicted in FIG. 3, the pressure P1 in the accumulation line 140 slightly decreases as the opened bypass valve 172 allows residual fluid to expand into the bypass line 170 and the pressure P2 in the delivery line 150 significantly increases as the pressurized air enters the delivery line 150 through the opened air supply valve 162. The method 200 subsequently includes opening 206 the metering valve 120. The pressure P1 in the accumulation line 140 increases and the pressure P2 in the delivery line 150 decreases as the high pressure air flows across the metering valve 120 and into the pump assembly 20 of the system 100. During this step 206 in the method 200, the mixture of air and DEF liquid is separated, forming a continuous column of air in the supply line 130 and pushing the DEF liquid further upstream (i.e. back into the DEF tank 180). With a continuous column of air in the supply line 130, the method includes closing 208 the metering valve 120 and closing 210 the bypass valve 172 and the air supply valve 162. With the valves 120, 172, 162, closed, the pump 110 may be actuated 212, causing the now continuous column of air in the supply line 130 to be pumped into the accumulation line 140 before any DEF liquid is pumped into the accumulation line 140, thus allowing the pump 110 to successfully prime in preparation for injecting DEF into the exhaust aftertreatment system 190.

Figure 4:
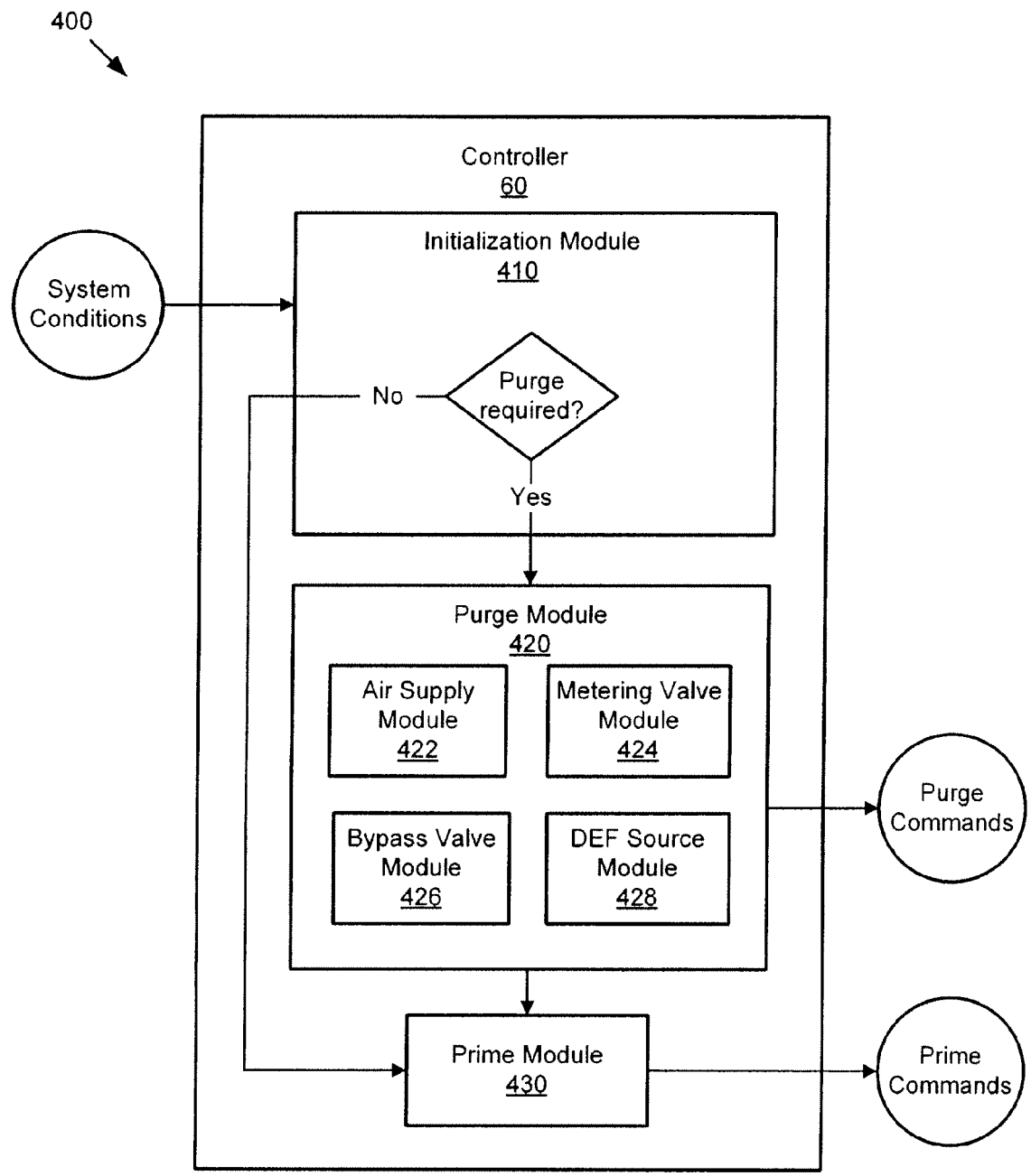
FIG. 4 is a schematic block diagram of a controller apparatus for a diesel exhaust fluid purging system, according to one embodiment.

FIG. 4 is a schematic block diagram 400 of a controller apparatus 60 for a diesel exhaust fluid purging system 100, according to one embodiment. In one embodiment, the controller apparatus 60 includes an initialization module 410, a purge module 420, and a prime module 430. In another embodiment, the purge module 420 further includes an air supply module 422, a metering valve module 424, a bypass valve module 426, and a diesel exhaust fluid source module 428. The controller apparatus 60, as depicted in FIG. 1, controls the valves (depicted by the dashed communication lines) and various other components (communication lines not depicted) in the system 100.

The controller 60 receives system conditions and, through the various modules, generates operating commands that are sent to the various valves and components of the system. Specifically, the initialization module 410 receives the system conditions. The system conditions may include the pressure and temperature of certain components. In another embodiment, the system conditions include the relative concentration of DEF and air in the system lines, the downtime of the internal combustion engine (i.e., how long the engine has been in a non-operating state), the status and condition of the valves, the status and condition of the various vessels and lines of the system, the measured operating condition of the internal combustion engine and/or the aftertreatment system, and the target (e.g., setpoint) operating condition of the internal combustion engine and/or the aftertreatment system, among others. The initialization module 410 may receive the system conditions via direct monitoring of the system components or the initialization module 410 may receive the system conditions by referring to system models and data correlation tables that predict the conditions that are present in the system. Additionally or alternatively, the initialization module 410 may infer system conditions from information received from the main electronic control module of the engine. For example, on engine start-up, the main electronic control module of the engine may send a signal to the initialization module 410 relating to the purge and prime processes.

The initialization module 410 analyzes the received system conditions and determines what processes should be carried out to bring the system to a stable operating condition. According to one embodiment, as depicted in FIG. 4, the initialization module 410 determines if a purging process is needed or if the system can directly commence with priming the pump. Depending on the received system conditions, the initialization module 410 may determine the length of the purge procedure or the initialization module 410 may defer such a determination to the purge module 420. In other words, the initialization module 410 may relay specific commands or requests for the purge module 420 to perform, or the initialization module 410 may simply determine "yes" or "no" (relating to the necessity for a purge process) and pass on certain variables and conditions to the purge module 420. The determination of whether a purge is needed is based, at least in part and according to one embodiment, on the content of the system lines. As discussed above, if discrete columns of air are dispersed throughout the residual DEF in the system lines, the initialization module 410 will determine that a purge is necessary. In another embodiment, the initialization module 410 may determine other factors relating to the operability of the system (not just those factors relating to the necessity of a purge).

If the initialization module 410 determines that a purge is necessary (or at least beneficial), the initialization module 410 will send such a signal to the purge module 420. The purge module 420 receives the conditions and/or requests from the initialization module 410 and assigns the conditions and requests to the proper sub-module. The purge module 420 includes various sub-modules, including an air supply module 422, a metering valve module 424, a bypass valve module 426, and a DEF source module 428. These modules 422, 424, 426, 428 are responsible for sending commands to various components of the system to effectuate changes to the system. For example, the air supply module 422 may communicate with the air supply source 164 and the air supply valve 162 to control the pressure, temperature, and flow-rate of the air supply that is capable of entering the system. The air supply module 422 may send out commands for the air supply valve 162 to open or close or for the air supply source 164, for example, to increase the pressure of the air supply.

Similarly, the metering valve module 424 controls the fluid flow between the pump assembly 20 and the injection assembly 40 via the metering valve 120. The metering valve module 424 may send a signal the metering valve 120 to open and close at various stages during the purge process. In one embodiment, the metering valve module 424 may send a command for the metering valve 120 to open for a time period and the metering valve module 424 may wait to receive further requests from the purge module 420 and, indirectly, the initialization module 410. The bypass valve module 426 also receives requests and/or conditions but controls the bypass valve 172 located in the bypass line 170.

In one embodiment, for example, the air supply module 422 and the bypass module 426 may send signals to the air supply valve 162 and the bypass valve 172, respectively, to remain open until otherwise commanded. During this period, the high pressure air fills the lines of the injection assembly 40 and the pressure in the pump assembly 20 decreases due to the increased line volume made accessible by the opening of the bypass valve 172. The metering valve module 424 may then signal the metering valve 120 to open, allowing the high pressure air to move into the pump assembly 20 and purge the lines of residual DEF. Once the initialization module 410 determines, based on direct monitoring of the system or reference to system models, that the lines (at least the supply line 130) are free of residual DEF and that only a continuous column of air remains, the initialization module 410 may send signal to the purge module 420 and to the appropriate sub-modules that the purge process is complete and that the system is ready for priming. The purge module 420 may also include a DEF source module 428 that communicates with the DEF source 180 to control the pressure, temperature, concentration, and charge level of the DEF supply tank 180.

Once the system is purged, or if no purge was determined necessary by the initialization module 410, the prime module 430 is notified and the prime module 430 communicates with the pump 110 to begin priming. It is contemplated that the prime module 430 may communicate with and send command signals to other components of the system as is necessary to carry-out a priming procedure. Those of ordinary skill in the art will recognize other functions and steps involved with priming a pump 110 and it is contemplated that such other functions and steps fall within the scope of this disclosure and within the purview of the prime module 430.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

As will be appreciated by one skilled in the art, aspects of the present disclosure may be embodied as a module, a method, or a computer program product. Accordingly, aspects of the presently disclosed method and modules may take the form of an entirely hardware embodiment, an entirely software embodiment (including firmware, resident software, micro-code, etc.) or an embodiment combining software and hardware aspects that may all generally be referred to herein as a "method." Furthermore, aspects of the present modules may take the form of a computer program product embodied in one or more computer readable medium(s) having computer readable program code embodied thereon.

Many of the functional units described in this specification have been labeled as steps in a method or modules, in order to more particularly emphasize their implementation independence. For example, a module may be implemented using a hardware circuit comprising custom VLSI circuits or gate arrays, off-the-shelf semiconductors such as logic chips, transistors, or other discrete components. A step in the module may also be implemented using programmable hardware devices such as field programmable gate arrays, programmable array logic, programmable logic devices or the like.

Modules may also be implemented using software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where modules are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A diesel exhaust fluid purging system, comprising:
a metering valve comprising a supply port and a delivery port;
a pump assembly fluidly connected to the supply port of the metering valve, the pump assembly comprising a pump and a single supply line in fluid communication with a diesel exhaust fluid (DEF) source;
an injection assembly fluidly connected to the delivery port of the metering valve, the injection assembly comprising an air supply line in fluid communication with an air supply source; and
a controller in electrical communication with the metering valve, the pump assembly, and the injection assembly, the controller configured to purge the pump assembly of residual diesel exhaust fluid (DEF) using air from the air supply line, the controller configured to:
open a bypass valve and an air supply valve of the air supply line;
after opening the bypass valve and the air supply valve, open the metering valve;
after opening the metering valve, close the metering valve;
after closing the metering valve, close the bypass valve and the air supply valve; and
after closing the bypass valve and the air supply valve, actuate the pump.

2. The system of claim 1, wherein the pump comprises an inlet and an outlet, the single supply line being fluidly connected to the pump inlet.

3. The system of claim 2, wherein the system further comprises an accumulation line that fluidly connects the pump outlet to the supply port of the metering valve, and a bypass line that fluidly connects the accumulation line to the single supply line, the bypass line comprising the bypass valve.

4. The system of claim 3, wherein the injection assembly comprises:
a delivery line fluidly connected to the delivery port of the metering valve and fluidly connectable with an exhaust aftertreatment system;
the air supply valve being in the air supply line, wherein the air supply line is fluidly connected to the delivery line.

5. The system of claim 4, wherein the accumulation line comprises a vessel for containing pressurized fluid.

6. The system of claim 3, wherein the controller is configured to close the bypass valve of the bypass line and open the metering valve while the bypass line is closed to allow air from the air supply source to enter the accumulation line via the air supply line.

7. The system of claim 6, wherein the controller is configured to open the bypass valve of the bypass line to lower a pressure in the accumulation line before closing the bypass valve of the bypass line and opening the metering valve.

8. The system of claim 1, wherein the DEF source contains urea and water.

9. A method for purging a diesel exhaust fluid system having a diesel exhaust fluid (DEF) source, a pump downstream of the source, a metering valve downstream of the pump, a bypass valve downstream of the pump and upstream of the metering valve, and an air supply valve downstream of the metering valve, the method comprising:
opening the bypass valve and the air supply valve;
after opening the bypass valve and the air supply valve, opening the metering valve;
after opening the metering valve, closing the metering valve;
after closing the metering valve, closing the bypass valve and the air supply valve; and
after closing the bypass valve and the air supply valve, actuating the pump.

10. The method of claim 9, wherein only a single fluid supply line receives diesel exhaust fluid (DEF) from the diesel exhaust fluid (DEF) source.

11. The method of claim 10, wherein only a single fluid supply line for diesel exhaust fluid (DEF) exists between the pump and the metering valve.

12. The method of claim 10, wherein only a single fluid supply line for diesel exhaust fluid (DEF) exists between the pump and the air supply valve.

13. The method of claim 9, further comprising predicting a presence of discrete columns of air in a fluid line between the diesel exhaust fluid (DEF) source and the pump, wherein opening the bypass valve and the air supply valve occurs after predicting the presence of discrete columns of air in the fluid line.

14. The method of claim 9, wherein prior to opening the metering valve, pressurizing a fluid line between the metering valve and the air supply valve with pressurized air.

15. The method of claim 14, wherein only a single fluid supply line receives diesel exhaust fluid DEF) from the diesel exhaust fluid (DEF) source, and wherein after opening the metering valve, purging the single fluid supply line of discrete columns of air with the pressurized air.

16. The method of claim 15, wherein a pressure of the pressurized air is greater than a pressure of diesel exhaust fluid (DEF) in the single fluid supply line.

17. A controller apparatus for a diesel exhaust fluid (DEF) system, the system comprising a pump assembly fluidly connected to an injection assembly via a metering valve, the apparatus comprising:
  an initialization circuit configured to receive system conditions;
  a purge circuit configured to receive operating requests from the initialization circuit and send operating commands to purge the system, the purge circuit comprising:
    an air supply circuit configured to control an air flow into the injection assembly,
    a metering valve circuit configured to control air flow into the pump assembly for purging the pump assembly, and
    a bypass valve circuit configured to control diesel exhaust fluid (DEF) flow back into a diesel exhaust fluid (DEF) source;
  the operating commands configured to:
    open a bypass valve and an air supply valve;
    after opening the bypass valve and the air supply valve, open the metering valve;
    after opening the metering valve, close the metering valve;
    after closing the metering valve, close the bypass valve and the air supply valve; and
    after closing the bypass valve and the air supply valve, actuate the pump assembly.

18. The apparatus of claim 17, further comprising a prime circuit configured to receive operating requests from the initialization circuit or the purge circuit and send operating commands to prime the system.

19. The apparatus of claim 17, wherein the purge circuit further comprises a diesel exhaust fluid (DEF) source circuit configured to control a source of diesel exhaust fluid (DEF).

20. The apparatus of claim 17, wherein in response to operating commands to purge the system, the bypass valve circuit opens a bypass valve to allow diesel exhaust fluid (DEF) to flow back into the diesel exhaust fluid (DEF) source, the air supply circuit controls the air flow to build up air pressure downstream of the metering valve, and the metering valve circuit opens the metering valve to allow pressurized air downstream of the metering valve to flow into the injection assembly.

* * * * *